(12) United States Patent
Carlsson et al.

(10) Patent No.: US 10,038,898 B2
(45) Date of Patent: Jul. 31, 2018

(54) ESTIMATING QUALITY OF A VIDEO SIGNAL

(71) Applicant: Microsoft Technology Licensing, LLC, Redmond, WA (US)

(72) Inventors: Pontus Carlsson, Bromma (SE); Andrei Jefremov, Jarfalla (SE); Sergey Silkin, Nacka (SE); David Zhao, Solna (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 14/960,017

(22) Filed: Dec. 4, 2015

(65) Prior Publication Data

US 2016/0088293 A1    Mar. 24, 2016

Related U.S. Application Data

(63) Continuation of application No. 13/659,573, filed on Oct. 24, 2012, now Pat. No. 9,237,289.

(30) Foreign Application Priority Data

Oct. 25, 2011 (GB) .................................. 1118406.6

(51) Int. Cl.
*H04N 5/44*     (2011.01)
*H04N 17/04*    (2006.01)
(Continued)

(52) U.S. Cl.
CPC .............. *H04N 17/04* (2013.01); *H04N 5/44* (2013.01); *H04N 19/139* (2014.11);
(Continued)

(58) Field of Classification Search
CPC .... H04N 17/004; H04N 17/04; H04N 19/139; G06T 7/0002
(Continued)

(56) References Cited

U.S. PATENT DOCUMENTS 7,038,710 B2    5/2006   Caviedes
7,039,117 B2    5/2006   Chan
(Continued)

FOREIGN PATENT DOCUMENTS

CN   1669322   9/2005
EP   1467568   3/2004
(Continued)

OTHER PUBLICATIONS

"Combined Search & Examination Report", GB Application No. 1118406.6, dated Apr. 24, 2013, 12 pages.
(Continued)

*Primary Examiner* — Gims S Philippe
(74) *Attorney, Agent, or Firm* — Schwegman Lundberg & Woessner, P.A.

(57) ABSTRACT

Method, device and computer program product for estimating quality of a video signal, wherein frames of the video signal are received at receiving means of the device, each frame comprising a plurality of blocks of pixels. A section of a first frame of the video signal, which is correctly received, is used to provide a concealed block for use in place of a block of a second frame of the video signal. A difference measure is determined indicative of a difference between at least some of the pixels surrounding the block in the second frame and the corresponding pixels surrounding the section in the first frame. The difference measure is used to estimate the quality of the second frame of the video signal.

20 Claims, 7 Drawing Sheets

(51) Int. Cl.
| | | |
|---|---|---|
| H04N 19/139 | (2014.01) | |
| H04N 19/176 | (2014.01) | |
| H04N 19/895 | (2014.01) | |
| H04N 21/44 | (2011.01) | |
| H04N 21/442 | (2011.01) | |

(52) U.S. Cl.
CPC ......... *H04N 19/176* (2014.11); *H04N 19/895* (2014.11); *H04N 21/44008* (2013.01); *H04N 21/44209* (2013.01)

(58) Field of Classification Search
USPC .................... 348/725, 180, 190; 382/197
See application file for complete search history.

(56) References Cited

U.S. PATENT DOCUMENTS

| | | | |
|---|---|---|---|
| 7,466,755 | B2 | 12/2008 | Chen et al. |
| 7,733,372 | B2* | 6/2010 | Ong .................... H04N 17/004 348/180 |
| 8,155,213 | B2 | 4/2012 | Huang et al. |
| 8,254,438 | B2 | 8/2012 | Davis |
| 8,456,531 | B2* | 6/2013 | Winkler ............... H04N 17/004 348/192 |
| 9,237,289 | B2 | 1/2016 | Carlsson et al. |
| 9,609,321 | B2 | 3/2017 | Zhao et al. |
| 2001/0026630 | A1 | 10/2001 | Honda |
| 2003/0056168 | A1 | 3/2003 | Krishnamachari |
| 2004/0139462 | A1 | 7/2004 | Hannuksela et al. |
| 2004/0151244 | A1 | 8/2004 | Kim et al. |
| 2005/0031219 | A1 | 2/2005 | Puri et al. |
| 2005/0157799 | A1 | 7/2005 | Raman et al. |
| 2007/0237098 | A1 | 10/2007 | Wang |
| 2008/0062322 | A1 | 3/2008 | Dey et al. |
| 2008/0080623 | A1 | 4/2008 | Kim et al. |
| 2008/0088743 | A1 | 4/2008 | Zhu et al. |
| 2008/0247469 | A1 | 10/2008 | Vadapalli et al. |
| 2008/0285651 | A1 | 11/2008 | Au et al. |
| 2009/0003461 | A1 | 1/2009 | Kwon et al. |
| 2009/0041114 | A1 | 2/2009 | Clark |
| 2009/0086826 | A1 | 4/2009 | May et al. |
| 2009/0153668 | A1 | 6/2009 | Kim et al. |
| 2010/0002771 | A1 | 1/2010 | Huang et al. |
| 2010/0011274 | A1 | 1/2010 | Stockhammer et al. |
| 2010/0091841 | A1 | 4/2010 | Ishtiaq et al. |
| 2010/0275105 | A1 | 10/2010 | Ouedraogo et al. |
| 2010/0309985 | A1 | 12/2010 | Liu et al. |
| 2010/0322314 | A1 | 12/2010 | Huang et al. |
| 2011/0080952 | A1 | 4/2011 | Vadapalli et al. |
| 2011/0311147 | A1* | 12/2011 | Pahalawatta .......... G06T 7/0002 382/197 |
| 2012/0008832 | A1 | 1/2012 | Wang et al. |
| 2012/0128071 | A1 | 5/2012 | Celetto et al. |
| 2012/0170658 | A1 | 7/2012 | Anderson et al. |
| 2012/0189168 | A1 | 7/2012 | El-Maleh et al. |
| 2013/0016775 | A1 | 1/2013 | Varodayan et al. |
| 2013/0114002 | A1 | 5/2013 | Carlsson |
| 2013/0271668 | A1 | 10/2013 | Argyropoulos et al. |
| 2014/0211860 | A1 | 7/2014 | Zhao et al. |

FOREIGN PATENT DOCUMENTS

| | | |
|---|---|---|
| EP | 2129136 | 12/2009 |
| EP | 2661894 | 11/2013 |
| WO | WO-03041382 | 5/2003 |
| WO | WO-2004008733 | 1/2004 |
| WO | WO-2005084035 | 9/2005 |
| WO | WO-2011134113 | 11/2011 |
| WO | WO-2012089678 | 7/2012 |

OTHER PUBLICATIONS

"Final Office Action", U.S. Appl. No. 13/340,023, dated Sep. 8, 2015, 23 pages.
"Final Office Action", U.S. Appl. No. 13/659,573, dated May 4, 2015, 10 pages.
"Final Office Action", U.S. Appl. No. 13/803,738, dated Nov. 5, 2015, 19 pages.
"Foreign Notice of Allowance", EP Application No. 11799454.1, dated Jan. 19, 2015, 6 pages.
"Foreign Office Action", CN Application No. 201180063561.0, dated Jul. 22, 2015, 12 pages.
"Foreign Office Action", GB Application No. 1118406.6, dated Apr. 15, 2015, 4 pages.
"International Search Report and Written Opinion", Application No. PCT/US2014/013451, dated Apr. 22, 2014, 10 pages.
"International Search Report and Written Opinion", Application No. PCT/EP2011/073986, dated Mar. 8, 2012, 14 Pages.
"Non-Final Office Action", U.S. Appl. No. 13/340,023, dated Jan. 27, 2015, 26 pages.
"Non-Final Office Action", U.S. Appl. No. 13/659,573, dated Sep. 16, 2014, 12 pages.
"Non-Final Office Action", U.S. Appl. No. 13/803,738, dated Apr. 24, 2015, 17 pages.
"Notice of Allowance", U.S. Appl. No. 13/659,573, dated Aug. 13, 2015, 4 pages.
"Search Report", GB Application No. 1301449.3, dated Aug. 18, 2014, 4 pages.
"Second Written Opinion", Application No. PCT/US2014/013451, dated Jan. 27, 2015, 7 Pages.
Agrafiotis,"Optimized Temporal Error Concealment through Performance Evaluation of Multiple Concealment Features", Centre for Communications Research, Dept. of Electrical & Electronic Eng., University of Bristol, 2006, pp. 211-212.
Belfiore,"Concealment of Whole-Frame Losses for Wireless Low Bit-Rate Video Based on Multiframe Optical Flow Estimation", IEEE Transactions on Multimedia, vol. 7, No. 2, Apr. 2005, pp. 316-329.
Chen,"Robust Video Region-of-interest Coding Based on Leaky Prediction", IEEE Transactions on Circuits and Systems for Video Technology, Sep. 2009, 8 pages.
Girod,"Feedback-Based Error Control for Mobile Video transmission", Proceedings of the IEEE, 87 (10), Oct. 1999, 17 Pages.
Hadizadeh,"Saliency-Cognizant Error Concealment in Loss-Corrupted Streaming", IEEE International Conference on Multimedia and Expo, Jul. 9, 2012, pp. 73-78.
Liu,"Multiframe Error Concealment for Whole-Frame Loss in H.264/AVC", College of Computer Science, Zhejiang University, Hangzhou, P. R. China, Image Processing, 2007. ICIP 2007. IEEE International Conference on, Sep. 16, 2007, 4 pages.
Wang,"A Region and Data Hiding Based Error Concealment Scheme for", IEEE Transactions on Consumer Electronics, vol. 47, No. 2, May 2001, pp. 257-262.
Wang,"Error Control and Concealment for Video Communication: A Review", Proceedings of the IEEE, 86(5), May 1998, 24 Pages.
Yamada,"No-Reference Video Quality Estimation Based on Error-Concealment Effectiveness", IEEE, 2007, 2007, 6 pages.
"Non-Final Office Action", U.S. Appl. No. 13/340,023, dated Jun. 3, 2016, 21 pages.
"Non-Final Office Action", U.S. Appl. No. 13/803,738, dated May 20, 2016, 20 pages.
"Supplemental Notice of Allowance", U.S. Appl. No. 13/659,573, dated Nov. 6, 2015, 2 pages.
"Corrected Notice of Allowance", U.S. Appl. No. 13/803,738, dated Dec. 28, 2016, 4 pages.
"Foreign Office Action", EP Application No. 15162615.7, dated Nov. 2, 2016, 4 pages.
"Notice of Allowance", U.S. Appl. No. 13/803,738, dated Nov. 21, 2016, 13 pages.
"Supplemental Notice of Allowance", U.S. Appl. No. 13/803,738, dated Dec. 9, 2016, 4 pages.
"Corrected Notice of Allowance", U.S. Appl. No. 13/803,738, dated Feb. 10, 2017, 2 pages.
"Final Office Action", U.S. Appl. No. 13/340,023, dated Jan. 6, 2017, 25 pages.

(56) References Cited

OTHER PUBLICATIONS

"Foreign Office Action", EP Application No. 15162615.7, dated Mar. 30, 2016, 4 pages.

* cited by examiner

ESTIMATING QUALITY OF A VIDEO SIGNAL

RELATED APPLICATIONS

This application is a continuation of and claims priority to U.S. patent application Ser. No. 13/659,573 filed Oct. 24, 2012 which further claims priority under 35 USC 119 or 365 to Great Britain Application No. 1118406.6 filed Oct. 25, 2011, the disclosures of which are incorporated by reference in their entirety.

BACKGROUND

A video signal can be transmitted in data packets over a network from a transmitting device to a receiving device. A video signal may comprise a sequence of video frames which are to be played out in order to thereby output the video signal. Each frame may comprise a plurality of blocks of pixels (or "macroblocks") which are coded separately. A block may be intra coded meaning that the block is coded without reference to data in other frames of the video signal. Alternatively a block may be inter coded meaning that the block is coded with reference to data in other frames ("reference frames") of the video signal. An inter coded block may be associated with a motion vector to describe motion in the image between the block and a corresponding position in the reference frame.

Errors may occur during the transmission of the video signal, for example a data packet may be lost or corrupted during transmission. When blocks are inter coded, errors may propagate through a sequence of frames of the video signal. Errors may be caused by conditions on the network on which the video signal is transmitted. As an example, network conditions may vary for receiving devices of individual users on a network (e.g. the internet) such that the errors experienced by each individual user may be different to other users. It can be useful to monitor quality of the video signal received at each of the receiving devices. Three methods of assessing video quality are:

1. Full Reference (FR) methods which evaluate video quality in a processed video signal (e.g. a received video signal) by comparing an original video signal (e.g. a transmitted video signal) and the processed video signal;
2. Reduced Reference (RR) methods which evaluate video quality in a processed video signal (e.g. a received video signal) using both the processed video signal and a small amount of information extracted from the original video signal (e.g. the transmitted signal); and
3. No Reference (NR) methods which evaluate video quality in a processed video signal (e.g. a received video signal) on the basis of the processed video signal alone (i.e. without reference to the original video signal).

The No Reference methods are particularly useful in situations where a video signal is being transmitted from a transmitter over a network to a receiver because these methods allow the receiver to estimate the quality of the video signal without needing knowledge of the original (i.e. transmitted) video signal. Therefore it is not necessary to transmit any extra information to the receiver regarding the original video signal for specific use by the No Reference method. This is in contrast to the Full Reference and Reduced Reference methods for which the receiver would be required to have extra information regarding the original video signal in order to estimate the quality of the received video signal. Therefore, desirably the No Reference methods require less information to be transmitted from the transmitter to the receiver in order for the receiver to be able to estimate the quality of the received video signal, and therefore require less bandwidth on the network.

A No Reference method for estimating video quality may do so on the basis of the number of macroblocks containing errors which it has not been possible to conceal. Error concealment effectiveness is evaluated using motion-level information and luminance discontinuity at the boundaries of error regions. Motion information can be obtained from motion vectors in an input bitstream. If the motion vectors indicate a motion that is greater than a pre-determined threshold then error concealment is considered to be ineffective. Furthermore, the luminance discontinuity is calculated as an average of the absolute difference of the luminance values at the boundary between correctly decoded regions and regions to which error-concealment has been applied. If the luminance discontinuity is larger than a pre-determined threshold then error concealment is considered to be ineffective. The No Reference method of the prior art described above provides one way of estimating the quality of a received video signal at a receiving device. However, the method is not perfect because the number of macroblocks containing errors which it has not been possible to conceal may not always provide an accurate measure of the quality of the video signal and the method increases the decoding time required to decode a received video signal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The inventors have provided new No-Reference (NR) methods for estimation of quality of concealed video frames and for estimation of error propagation in subsequent frames of a video signal. In various embodiments, the methods are based on an analysis of the difference between external pixels of a concealed block (that is, pixels surrounding the concealed block in its frame) and the corresponding external pixels of the concealed block's reference block (that is, pixels surrounding the reference block in a reference frame of the video signal). The difference may be measured to provide a difference measure (or "difference metric") which may be stored for each block. Preferably, the analysis is applied only for blocks with complex motion (e.g. non-linear motion). The value of the difference metric may be propagated from reference frames to subsequent inter frames which are coded based on the reference frames throughout the sequence of frames of the video signal. The difference measure may alternatively be implemented as a similarity measure, wherein a high similarity measure corresponds to a low difference measure and vice versa.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Figure 1:
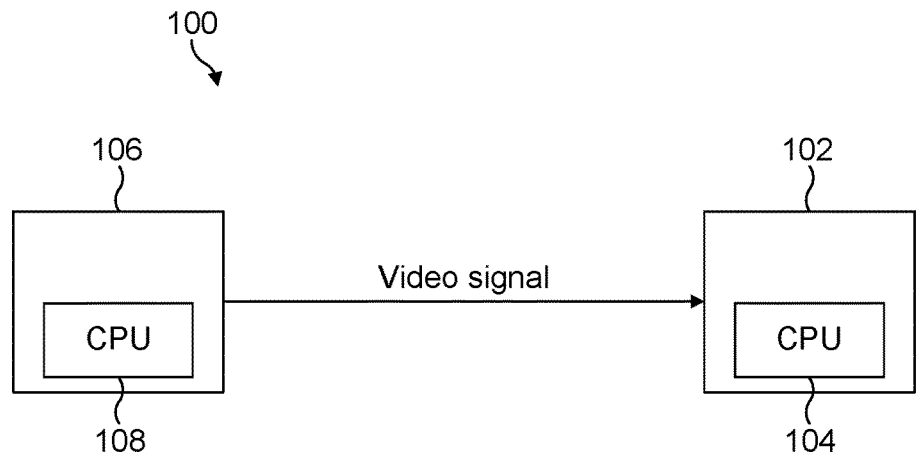
FIG. 1 shows a communication system according to one embodiment.

With reference to FIG. 1 there is described a communication system 100 comprising devices 102 and 106. The device 102 comprises a processing unit 104 for processing video data and the device 106 comprises a processing unit 108 for processing video data. The device 106 is arranged to transmit a video signal to the device 102. The video signal comprises a plurality of frames which can be output in sequence to thereby output the video signal at the device 102. The video signal is transmitted from the device 106 to the device 102 over a network, such as the internet. Each frame of the video signal may be coded into macroblocks and then transmitted in data packets from the device 106 to the device 102. The device 102 can then depacketize the received data packets and decode the macroblocks to retrieve the frames of the video signal. Methods of coding the macroblocks of the frames of the video signal and of packetizing the video data into data packets for transmission over the network are known in the art and are not described in detail herein. The macroblocks of a particular frame of the video signal may be coded (by inter-coding) with reference to data in another frame (e.g. a reference frame) of the video signal. Furthermore, each macroblock may be associated with a motion vector which indicates the motion of an image in that macroblock. The motion vector is used to ensure that the macroblock is coded based on a correct section of the reference frame.

Figure 2:
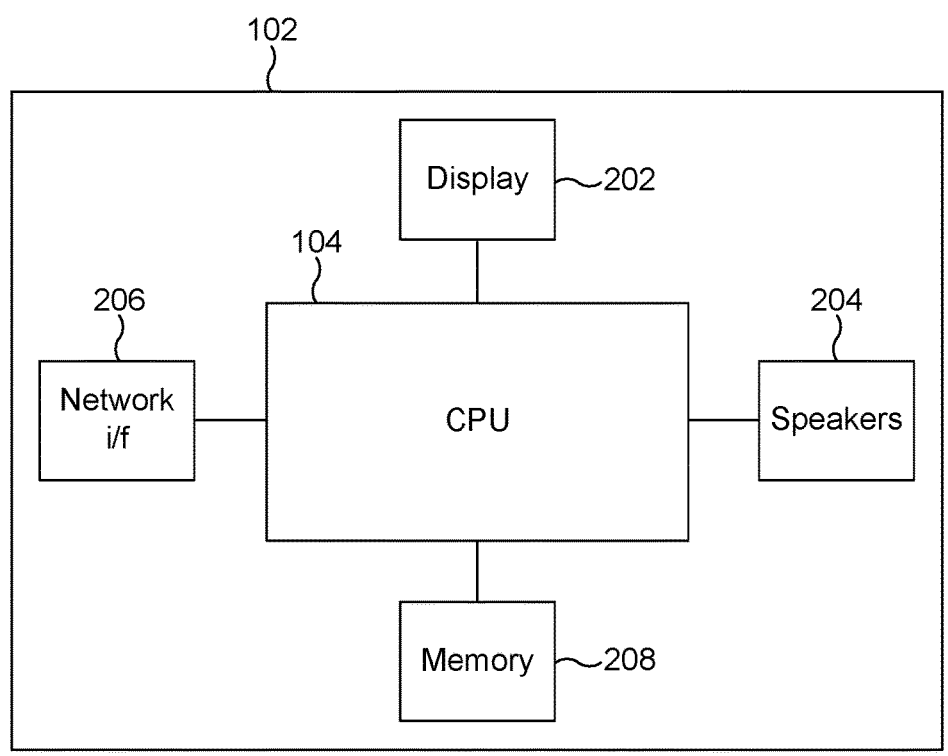
FIG. 2 shows a schematic view of a device according to one embodiment.

FIG. 2 shows a schematic view of the device 102 according to one embodiment. The device 102 comprises the processing unit (CPU) 104 for processing data, a display 202 for displaying video data, speakers 204 for outputting audio data, a network interface 206 for receiving data from the device 106 over a network and a memory 208 for storing data. The display 202, the speakers 204, the network interface 206 and the memory 208 are connected to the CPU 104. The display 202, the speakers 204, the network interface 206 and the memory 208 may be integrated into the device 102. In alternative devices one or more of the display 202, the speakers 204, the network interface 206 and the memory 208 may not be integrated into the device 102 and may be connected to the CPU 104 via respective interfaces. One example of such an interface is a USB interface.

Figure 3:
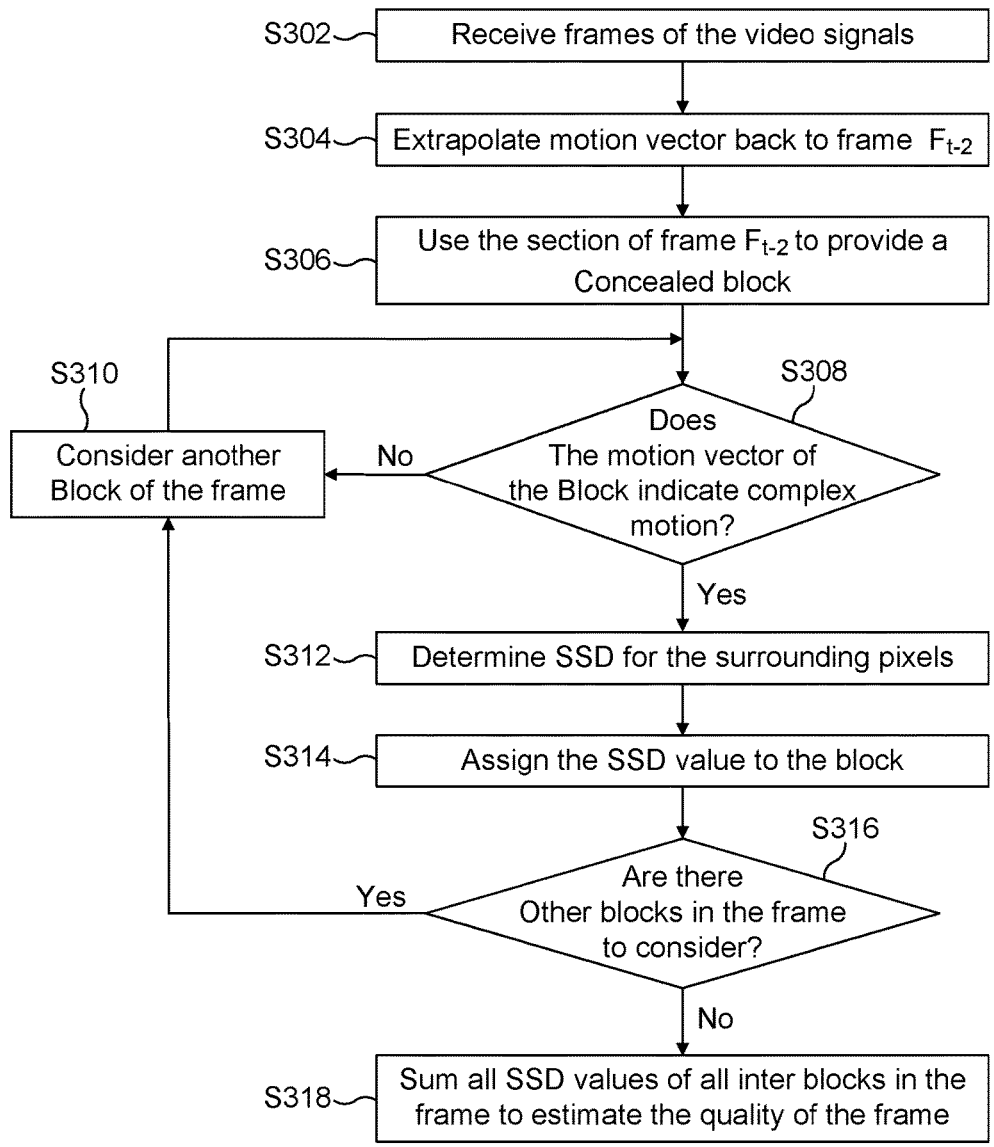
FIG. 3 is a flow chart for a first process of estimating quality of a video signal according to one embodiment.
Figure 4:
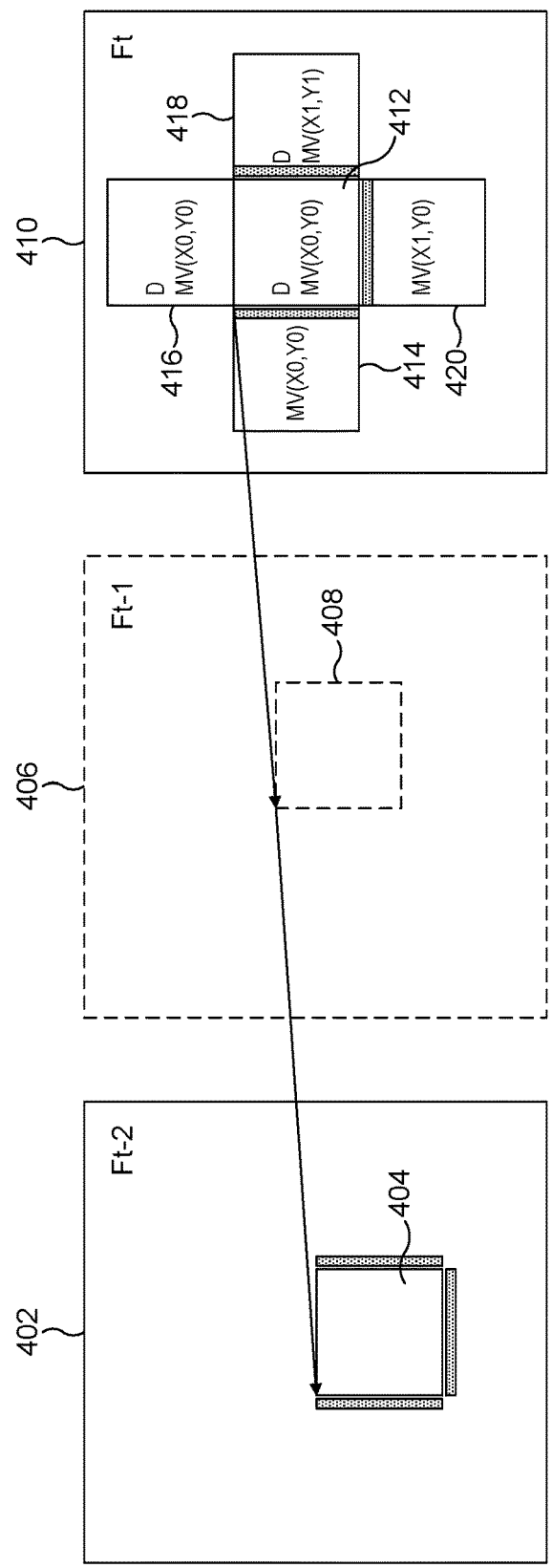
FIG. 4 is a representation of three consecutive frames of a video signal according to one embodiment.

With reference to FIGS. 3 and 4 there is now described a method of estimating quality of a video signal received at the device 102. In step S302 data packets comprising video data of the video signal are received at the device 102 from the device 106 over the network. The video data is depacketized from the received data packets. The video data comprises multiple frames of the video signal, wherein blocks of the frames are coded separately. As described above each block may have a motion vector which is used to indicate how to decode the block based on video data from a reference frame of the video signal (which may precede, or follow, the frame in question).

FIG. 4 shows three consecutive frames of a video signal which are received at the device 102. The three frames are frame $F_{t-2}$ 402 whose position in the sequence of frames of the video signal is t−2, frame $F_{t-1}$ 406 whose position in the sequence of frames of the video signal is t−1, and frame $F_t$ 410 whose position in the sequence of frames of the video signal is t. The block 412 of frame $F_t$ is coded with reference to a section (or "area") 408 of the frame $F_{t-1}$ as shown in FIG. 4. However, during transmission of the video signal from the device 106 to the device 102 the section 408 of the frame $F_{t-1}$ has been lost or corrupted, such that the block 412 of frame $F_t$ cannot be decoded using the section 408. It may be the case that the whole frame $F_{t-1}$ has been lost during transmission. Alternatively, it may the case that some of the frame $F_{t-1}$ has been received in the transmission of the video signal but that the section 408 has been lost during transmission.

In step S304 the motion vector of the block 412 of the frame $F_t$ is extrapolated to frame $F_{t-2}$ which precedes frame $F_{t-1}$. As shown in FIG. 4 the motion vector of the block 412 is extrapolated to a section 404 of the frame $F_{t-2}$. The section 404 of the frame $F_{t-2}$ has been correctly received and decoded at the device 102. Therefore the section 404 can be used to help conceal the error in relation to block 412 of frame $F_t$.

In step S306 the section 404 of the frame $F_{t-2}$ is used to provide a concealed block for use in the frame $F_t$ to replace the block 412. For example, the concealed block may be a copy of the pixels from the area 404 of the frame $F_{t-2}$. There may be other blocks in the frame $F_t$ which are coded with reference to sections of the frame $F_{t-1}$. Therefore there may be other blocks of the frame $F_t$ which cannot be properly decoded, for example if the whole frame $F_{t-1}$ is lost during transmission. In this case all of the inter-coded blocks of frame $F_t$ which refer to the lost frame $F_{t-1}$ are concealed by copying pixels from respective sections (or "areas") of frame $F_{t-2}$ (or from another correctly received frame preceding the lost frame $F_{t-1}$ in the video signal) which are referenced by extrapolating motion vectors to the frame $F_{t-2}$.

All of the blocks of the frame $F_t$ are either decoded directly from the video signals received in step S302 or concealed as described above. Therefore, once step S306 has been performed there are pixel values for the pixels of all of the blocks in the frame $F_t$. In the following steps (steps S308 to S318) described below the method provides an estimate of the quality of the frame $F_t$.

In step S308 it is determined whether the motion vector of the block 412 indicates complex motion. In this way the method highlights the concealed blocks in the frame $F_t$ which have complex motion. In order to do this, one or more motion vectors of the pixels from the section 404 of the reference frame $F_{t-2}$ are compared with the motion vector of the block 412 of frame $F_t$. The motion vectors are given in terms of X and Y (i.e. horizontal and vertical) components. In the example shown in FIG. 4, the blocks 412, 414 and 416 have motion vectors (X0,Y0), the block 418 has a motion vector (X1,Y1) and the block 420 has a motion vector (X1,Y0). The motion vector (x,y) indicates a motion in terms of a shift by a number of pixels in the x direction and a shift by a number of pixels in they direction between frames of the video signal. In the examples shown in FIG. 4, X0 is a number of pixels in the x direction and X1 is another number of pixels in the x direction. Similarly, Y0 is a number of pixels in the y direction and Y1 is another number of pixels in the y direction. If the absolute difference (that is the magnitude of the difference) between the x or y component of the motion vector of the block 412 of frame $F_t$ and the corresponding component of the one or more motion vectors of the pixels from the section 404 of the reference frame $F_t$ exceeds N pixels then the block 412 is marked as being a block with complex motion. This is because if the motion vector has changed by more than the threshold, N, then the motion in the image has not been uniform and linear between the frame $F_{t-2}$ and the frame $F_t$. In various embodiments N has been experimentally chosen to equal two pixels for both x and y components on Video Graphics Array (VGA) resolution. In other embodiments N may be chosen to equal a number of pixels other than two, such as one pixel or three or more pixels. In FIG. 4 the blocks 412, 416 and 418 are marked with a letter D to indicate that those blocks have complex motion, whereas the blocks 414 and 420 are not marked with a letter D to indicate that those blocks have simple motion.

In one or more embodiments, the quality of the frame 410 is determined by analysing the error concealment for only complex blocks of the frame. Therefore, if in step S308 it is determined that the motion vector of the block in question is simple then the method passes to step S310. In step S310 another block of the frame $F_t$ 410 which is coded with reference to a lost section of a previous frame (e.g. a section of the lost frame $F_{t-1}$) is considered in the estimation of the quality of the frame $F_t$ 410. The method then repeats by returning back to step S308 in which it is determined whether the newly considered block has a motion vector which indicates complex motion.

If it is determined in step S308 that the motion vector of the block 412 does indicate complex motion (which is the case in the example shown in FIG. 4) then the method passes to step S312. In step S312 a measure is determined of the success of the error concealment provided by the concealed block which is provided in step S306 to replace the block 412 in the frame $F_t$. The measure is a difference measure which provides a measure of the difference between the pixels surrounding the block 412 in the frame $F_t$ and the pixels surrounding the section 404 of the frame $F_{t-2}$. A high value of the difference measure indicates that the difference is large. The difference measure may be implemented in some embodiments as a similarity measure wherein a high value of the similarity measure indicates that the difference is small (i.e. that the similarity is high). The determination in step S312 is based on an estimation of the difference between pixels in the frame $F_t$ external to the block 412 and corresponding pixels external to the section 404 in the reference frame $F_{t-2}$. The difference measure may be implemented as a function of the differences. For example, in various embodiments, the difference measure is implemented as a sum of squared differences (SSD).

In FIG. 4 the pixels which are compared in step S312 are shaded. At least some of the pixels surrounding the block 412 are used in step S312 and the corresponding pixels surrounding the section 404 are also used in step S312. For example, as shown in FIG. 4, a column of pixels to the left of the block 412 and adjacent to the block 412, a column of pixels to the right of the block 412 and adjacent to the block 412, and a row of pixels below the block 412 and adjacent to the block 412 are compared with a corresponding column of pixels to the left of the section 404 and adjacent to the section 404, a column of pixels to the right of the section 404 and adjacent to the section 404, and a row of pixels below the section 404 and adjacent to the section 404. In various embodiments, the comparison involves determining a sum of the squared differences between the values of the corresponding pixels. The values of the pixels may be, for example, luminance or chrominance values of the pixels.

In the various embodiments the concealed block which is used to replace the block 412 in the frame $F_t$ is a copy of the pixels of the section 404 of the frame $F_{t-2}$. Since the frame $F_{t-2}$ is received correctly at the device 102 it is assumed that there is little or no error in the pixels of the section 404 and the surrounding pixels in the frame $F_{t-2}$. Therefore the boundary between the section 404 and the surrounding pixels (which are shaded in FIG. 4) which are used in the comparison in step S312 has a smooth transition (e.g. in terms of luminance or chrominance). Therefore in order for the concealed block in frame $F_t$ to have a smooth transition at the boundary between the concealed block and the surrounding pixels (which are shaded in FIG. 4) which are used in the comparison in step S312, the surrounding pixels in the frame $F_t$ will need to be similar to the surrounding pixels in frame $F_{t-2}$. Therefore the measure of the difference between the surrounding pixels in the frames $F_t$ and $F_{t-2}$ which are shown shaded in FIG. 4 provides a good indication as to the success of the error concealment provided by the concealed block provided in step S306. The surrounding pixels may or may not completely surround the block 412 (and the corresponding section 404). The surrounding pixels may be adjacent to the block 412 (and adjacent to the corresponding section 404). In particular, the surrounding pixels may be on the boundary of the block 412 (and on the boundary of the corresponding section 404). The surrounding pixels may be one or more pixels deep from the edge of the block 412 (and from the edge of the corresponding section 404). Furthermore, pixels which are adjacent to the block 412 in the frame $F_t$ but which are in a block with complex motion and which have a motion vector equal to that of the block 412 are not included in the "surrounding pixels" which are used to determine the SSD in step S312. This can be seen in FIG. 4 in which the pixels in block 416 which has non-linear motion and which has a motion vector (X0,Y0) which is the same as the motion vector of the block 412 are not included in the comparison of step S312 (they are not shaded in FIG. 4). In contrast, some pixels in blocks 414 and 420 are included in the comparison of step S312 (they are shaded in FIG. 4) because the blocks 414 and 420 do not have complex motion, and some pixels in block 418 are included in the comparison of step S312 (they are shaded in FIG. 4) because the block 418 has a different motion vector (that is (X1,Y1)) to that of the block 412.

In step S314 the SSD value which is determined in step S312 is assigned to the block 412.

In step S316 it is determined whether there are other blocks in the frame $F_t$ which are coded with reference to a lost section of a previous frame (e.g. a section of the lost frame $F_{t-1}$) and which need to be considered in order to determine an estimate of the quality of the frame $F_t$. If it is determined that there are more blocks in the frame $F_t$ to be considered then the method passes to step S310, described above, in which another block of the frame 410 is considered. The method then repeats by returning back to step S308, in which it is determined whether the newly considered block has a motion vector which indicates complex motion.

If it is determined in step S316 that there are no more blocks of the frame $F_t$ which need to be considered in the estimation of the quality of the frame $F_t$ (e.g. if all concealed blocks of the frame $F_t$ having complex motion have been considered) then the method passes to step S318 in which all of the SSD values which have been assigned to the blocks of the frame $F_t$ are summed to thereby provide an estimate of the quality of the frame $F_t$. The larger the sum of the SSDs determined in step S318 the lower the quality of the frame $F_t$. The sum of the SSDs in step S318 may be used to determine a peak signal-to-noise ratio (PSNR) for the frame $F_t$.

As described above, the computation of the SSD is performed for edges of blocks with complex (e.g. non-linear) motion, and not for edges of blocks with simple (e.g. linear) motion. In this way it is assumed that the blocks with simple motion have been correctly concealed such that they do not contribute to the sum of the SSDs performed in step S318. This is can be desirable as compared to including the SSD values computed for the simple blocks in the frame $F_t$ because as described above even if the concealment is perfect the SSD value may not be zero and as such even a perfect concealment would reduce the estimated quality of the frame $F_t$. It can be desirable to exclude blocks which have sufficiently small errors from the sum in step S318. Blocks are considered to have sufficiently small errors if they can be coded correctly from the received video data or if they have been concealed and have simple motion. It is only blocks which have been concealed and which have complex motion which are considered not to have sufficiently small errors to be excluded from the sum in step S318. Therefore the estimation of the quality of frame $F_t$ is based on the quality of concealment provided by the concealed blocks which have complex motion in the frame $F_t$.

The method shown in FIG. 3 therefore provides a No Reference method for estimating the quality of the frame $F_t$.

As described above, preferably, the quality of the frame 410 is determined by analysing the error concealment for only blocks of the frame which have complex motion. This can desirably mean that the concealed blocks which have simple motion do not add noise into the calculation of the total SSD value for the frame 410.

In the method described above, the concealed block which is used in place of the block 412 in the frame $F_t$ is an exact copy of the pixels of the section 404 of the reference frame $F_{t-2}$. However, in alternative embodiments the concealed block which is used in place of the block 412 in the frame $F_t$ may not be an exact copy of the pixels of the section 404 and may instead be altered in some way before being used in place of the block 412 in frame $F_t$.

It can also be useful to predict how errors will propagate through the frames of the video signal from reference frames to inter-coded frames which are coded based on the reference frames. A method for estimating the quality of a frame of a video signal is now described with reference to FIGS. 5 and 6.

Figure 5:
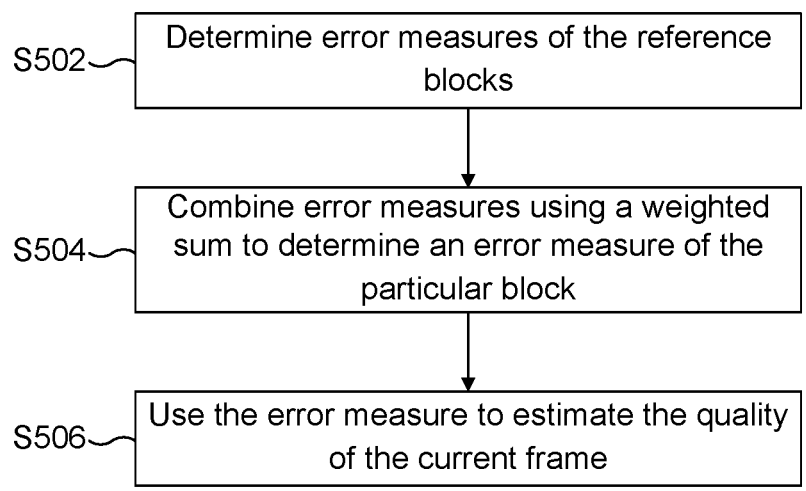
FIG. 5 is a flow chart for a second process of estimating quality of a video signal according to one embodiment.
Figure 6:
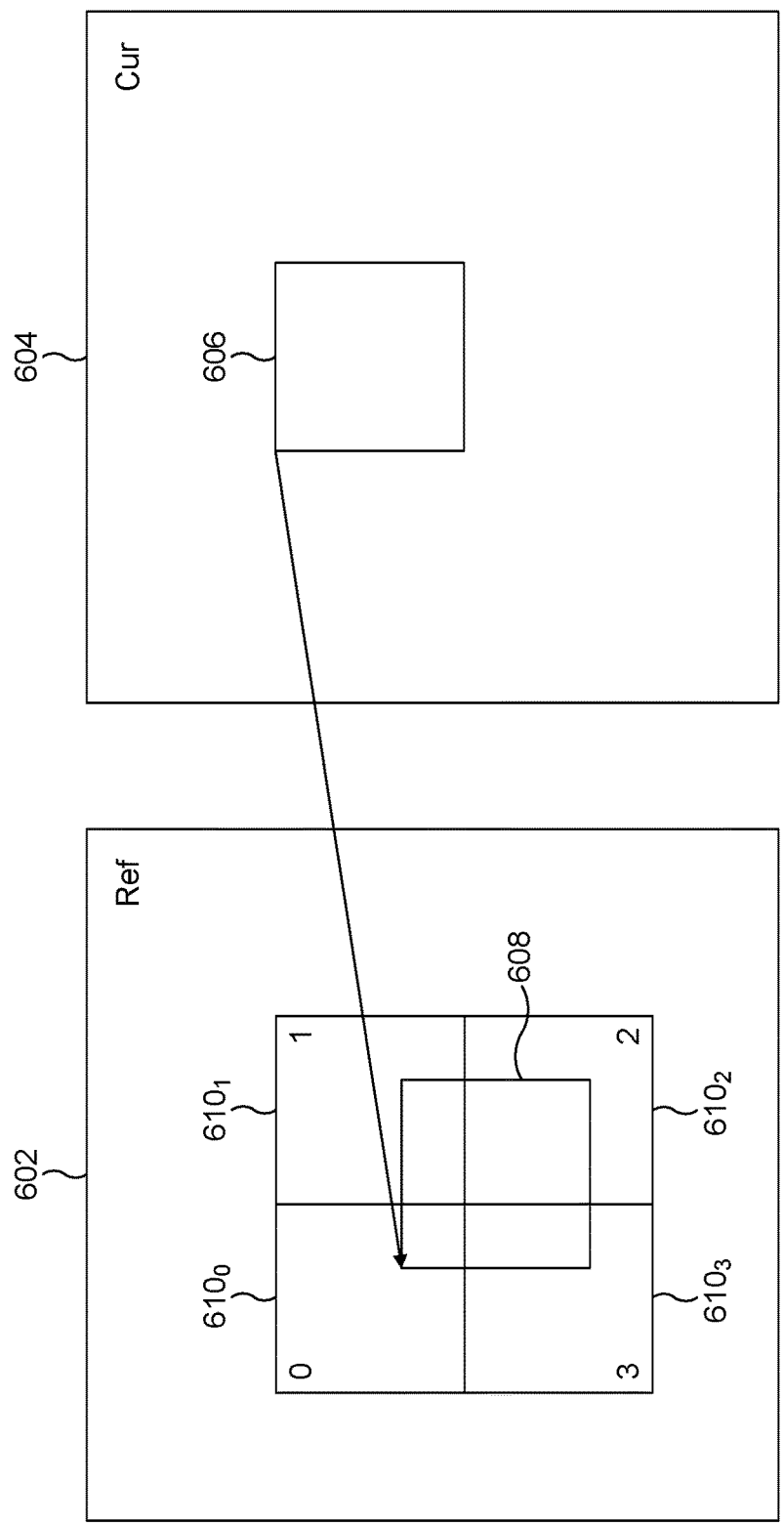
FIG. 6 is a representation of two frames of a video signal according to one embodiment.

The video frames of the video signal are received at the device 102 from the device 106 as described above. Two frames of the video signal are shown in FIG. 6. A reference frame 602 comprises a plurality of blocks $610_0$, $610_1$, $610_2$ and $610_3$. Each block of the reference frame is associated with a respective error measure, which may be determined by calculating a function of differences, such as the SSD values described above in relation to FIGS. 3 and 4. A current frame 604 comprises blocks, only one of which (block 606) is shown in FIG. 6 for clarity. The block 606 does not have an error measure assigned to it, and the method shown in FIG. 5 is concerned with determining an error measure for the block 606 which can then be used to estimate the quality of the frame 604.

In step S502 the error measures of the blocks $610_0$, $610_1$, $610_2$ and $610_3$ of the reference frame 602 are determined. This may simply involve retrieving the error measures assigned to the blocks $610_0$, $610_1$, $610_2$ and $610_3$ from a data store (e.g. memory 208). Alternatively, step S502 may involve determining the error measures of the blocks $610_0$, $610_1$, $610_2$ and $610_3$ for example using the method described above in relation to FIGS. 3 and 4. The error measures of the blocks $610_0$, $610_1$, $610_2$ and $610_3$ are indicative of respective errors in the blocks $610_0$, $610_1$, $610_2$ and $610_3$, and may for example be in the form of SSD values.

In step S504 the error measures of the blocks $610_0$, $610_1$, $610_2$ and $610_3$ are combined using a weighted sum to determine an error measure for the block 606 of the current frame 604. In order to do this the motion vector of the block 606 is used to determine a section 608 of the frame 602 based on which the block 606 is coded. As shown in FIG. 6, the section 608 includes part of each of the reference blocks $610_0$, $610_1$, $610_2$ and $610_3$. The weights in the weighted sum are based on the proportion of the section 608 which is covered by the respective blocks $610_0$, $610_1$, $610_2$ and $610_3$.

So for example, where the error measures are SSDs assigned to the blocks, the SSD of the block 606 of the current frame 604, $SSD_{cur}$, may be determined according to the weighted sum:

$$SSD_{cur} = \sum_x \frac{SSD_{ref,x} S_{ref,x,covered}}{S_{ref,x,total}}$$

where x is the index of the reference blocks $610_x$ (e.g. in the example shown in FIG. 6, x is in the range 0 to 3 to indicate the reference blocks $610_0$, $610_1$, $610_2$ and $610_3$), $SSD_{ref,x}$ is the SSD value of the reference block $610_x$, $S_{ref,x,covered}$ is the number of pixels of the section 608 which are included in the reference block $610_x$ and $S_{ref,x,total}$ is the total number of pixels of the section 608 in the reference frame 602.

Therefore, for inter blocks (e.g. block 606) of the current frame 604 the SSD values of reference blocks $610_0$, $610_1$, $610_2$ and $610_3$ are taken proportionally to the size of the area in each block which is used for prediction and summed. The resulting SSD value is assigned to inter block 606 of the current frame 604.

In step S506 the error measure of the block 606 is used to estimate the quality of the current frame 604. For example, other blocks in the current frame 604 may also have error measures and step S506 may include summing the error measures (e.g. the SSDs) of the blocks of the current frame 604. As described above, the sum of the SSDs of the blocks of the frame 604 provide an indication of the quality of the frame 604. A high value for the sum of SSDs of blocks in the frame 604 indicates a low quality of the frame 604 and in contrast, a low value for the sum of SSDs of blocks in the frame 604 indicates a high quality of the frame 604.

In this way the method described in relation to FIGS. 5 and 6 provides a method for propagating the effect of errors throughout a sequence of frames to thereby estimate the quality of multiple frames as a result of errors which propagate through the frames due to the inter-coding technique used to code the frames.

Figure 7:
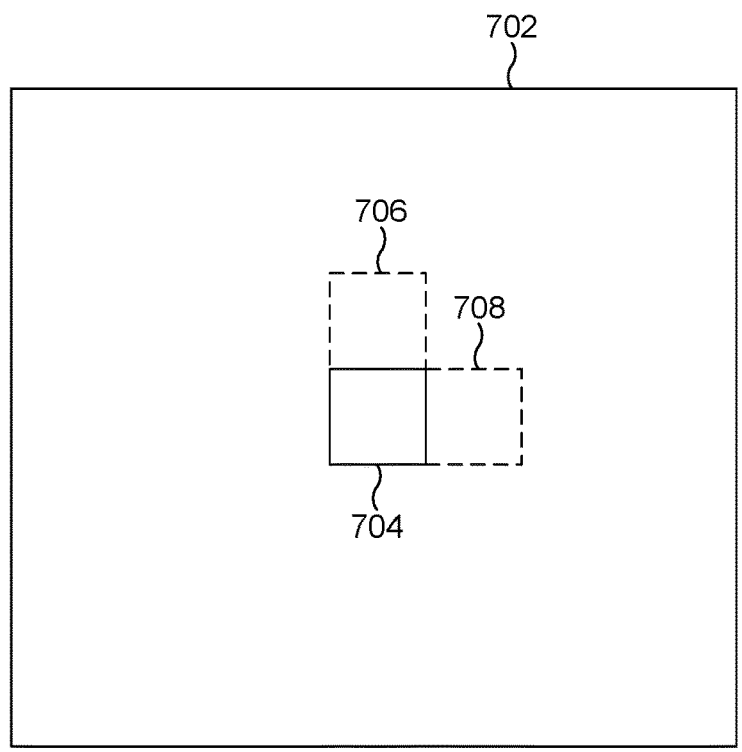
FIG. 7 is a representation of blocks of a frame.

FIG. 7 shows an intra-coded block 704 of a frame 702 of the video signal. Also shown in FIG. 7 are reference blocks 706 and 708 of frame 702. The block 704 is coded using spatial prediction based on at least some of the pixels of the reference blocks 706 and 708. The blocks 706 and 708 have SSD values assigned to them. If the block 704 is coded based on only one reference block then the SSD value of the reference block is assigned to the block 704. This provides a simple method for assigning an SSD value to the block 704 which can be used (e.g. in step S506 or a similar step) to estimate the quality of the current frame. As described above, summing all of the SSD values assigned to the blocks of a frame provides an estimate of the quality of the frame. If, as shown in FIG. 7, the block 704 is coded based on more than one reference block (in the example the reference blocks are blocks 706 and 708) then the maximum of the SSD values of the blocks 706 and 708 is assigned to the block 704. This provides a simple method of estimating the quality of the block 704, which can, in turn, be used to estimate the quality of the frame 702.

Figure 8:
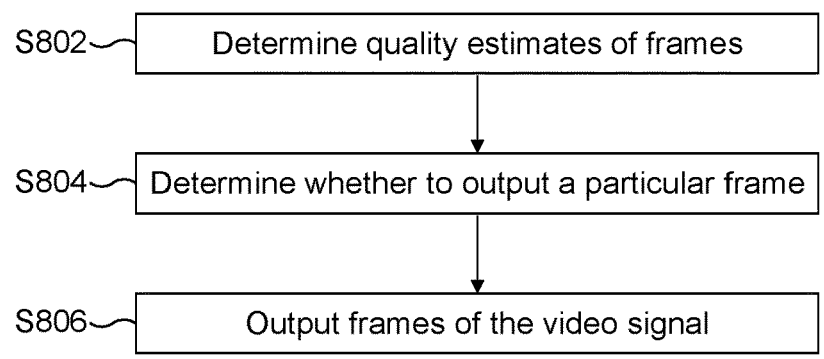
FIG. 8 is a flow chart for a process of outputting a video signal according to one embodiment.

With reference to FIG. 8 there is described a method of outputting a video signal at the device 102. As described above, the video signal is received from the device 106 and in step S802 quality estimates for the frames of the video signal are determined in accordance with the methods described above.

In step S804 it is determined whether a particular frame is to be output based on the quality of that particular frame. For example, it is determined whether the particular frame or another frame of the video signal should be output at the time when the particular frame is due to be output.

In step S806 frames of the video signal are output, and at the point in time when the particular frame is due to be output then the frame that was determined in step S704 is output.

For example, if the quality of the particular frame is high (e.g. above a threshold) then it may be decided that the particular frame is to be output when it is due to be output. However, if the quality of the particular frame is low (e.g. below the threshold) then it may be decided that another frame of the video signal (e.g. which has a higher quality) is to be output when the particular frame is due to be output. The decision may also be based on the quality of the other frames that may be output in place of the particular frame. For example, the other frame that is output in place of the particular frame may be the frame immediately preceding the particular frame in the sequence of frames of the video signal. In this case, the image of the video signal is frozen by displaying the preceding frame instead of the particular frame.

In another example, the other frame that is output in place of the particular frame may be the frame immediately following the particular frame in the sequence of frames of the video signal. In this case, the image of the video signal skips a frame and is then frozen by displaying the following frame instead of the particular frame.

The decision as to which frame to display depends upon the estimated quality of each of the frames. Frames with higher quality are more likely to be output than frames with lower quality. The decision as to which frame to display may include a trade-off between outputting frames of high quality on the one hand and reducing the freezing of the image of the video signal on the other hand.

When a frame of the video signal is lost during transmission then the threshold value for the quality of the frame may be increased. For example, the frame $F_{t-1}$ 406 shown in FIG. 4 may be lost during transmission. The threshold for the quality of the next frame (frame $F_t$ 410) is then increased in response to the loss of frame $F_{t-1}$ 406. Therefore frame $F_t$ 410 is required to be of a higher than normal quality for it to be output following the loss of the frame $F_{t-1}$ 406. However, if the quality of the frame $F_t$ 410 is higher than the quality of the frame (frame $F_{t-2}$ 402) immediately preceding the lost frame (frame $F_{t-1}$ 406) then the threshold for the quality of frame $F_t$ 410 is set at the normal value irrespective of the loss of frame $F_{t-1}$ 406. Therefore if the quality of the frames increases from frame $F_{t-2}$ 402 to frame $F_t$ 410 then the threshold of quality for the frame $F_t$ 410 is kept at the normal level even though the frame $F_{t-1}$ 406 has been lost during transmission. In this way, the probability of "freezing" the video signal on a particular frame which has a higher number of concealment artifacts (i.e. which has a low quality) is reduced.

Another feature relating to estimation of quality of a frame of a video signal is now considered. In particular, the inventors have realised that concealment distortions may be non-uniformly distributed within a frame of the video signal. For example, parts (or "sections") of a frame with intensive motion (that is, sections with high motion vectors) may contain more artifacts because such parts are more difficult to conceal using error concealment techniques. Local distortion in a frame of a video signal is noticeable to a user viewing the frame (that is, local distortion is perceptually detrimental to the quality of a frame of the video signal for a user) but, in prior art systems, the local distortion in the frame may be smoothed in the final value of the quality metric for the frame by other parts of the frame which are free from distortions (e.g. parts of the frame showing static background). For example, if a group of blocks of a frame have high levels of distortion (e.g. caused by movement in the frame in a particular region of the frame) whereas the remaining blocks of the frame have little or no distortion then the overall value of the quality of the frame may be indicated as being high, even though a user may perceive the quality as being poor due to the local distortion. This may cause a problem in the method of estimating the quality of the frame of the video signal. In particular, the quality of the frame may be determined to be above the required threshold for outputting the frame and as such the frame may be output, whereas it may be the case that the local distortion means that the frame is perceived by a user to be of a lower quality than is acceptable to be output.

Figure 9:
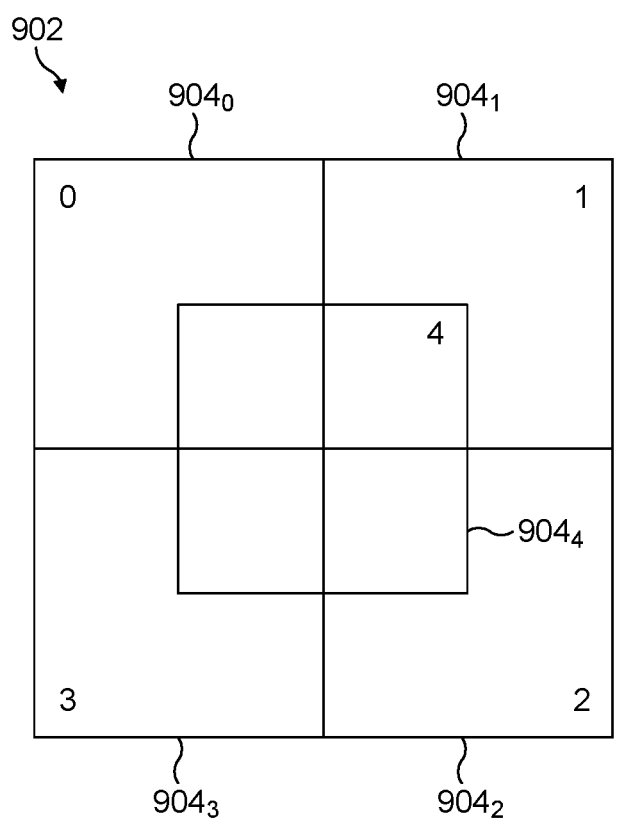
FIG. 9 is a representation of a frame of a video signal.

In order to address this problem with the prior art, as part of the quality estimation for the frame, the frame may divided into a plurality of sections and a quality metric (e.g. an SSD value as described above) is computed for each section and for the whole frame. For example, when the quality metric is a sum of squared differences SSDs, as described above, which are determined for each block then the SSDs may be summed for each of the blocks within each section of the frame to determine an SSD value for each of the sections. FIG. 9 shows a frame 902 of a video signal. In the example, shown in FIG. 9 the frame 902 has five sections $904_0$ to $904_4$, but in other embodiments the frame may include more or less than five sections. Each section of the frame 902 comprises one or more blocks of pixels. The sections 904 may or may not be of equal size. The sections 904 may or may not overlap with each other. A final quality metric is assigned to the frame which is the lowest of the quality metrics which have been determined using the SSD values of the blocks of pixels for either the frame 902 itself or one of the sections 904. That is, the final quality estimate for the frame 902, $Q_{final}$ is given by:

$$Q_{final} = \min(Q_n, Q_{frame}),$$

where $Q_n$ is the quality value (e.g. the SSD value) determined for the nth section $904_n$ and $Q_{frame}$ is as the quality value determined for the frame 902 described above, e.g. by summing the SSD values of the blocks of the frame 902.

Therefore the final quality estimate ($Q_{final}$) for the frame 902 equals the quality value ($Q_{frame}$) determined for the frame 902 as described above unless the quality value ($Q_n$) of one of the sections $904_n$ of the frame 902 is lower than the quality value $Q_{frame}$, in which case the final quality estimate ($Q_{final}$) for the frame 902 is set to be the quality value of the section $904_n$ of the frame 902 which has the lowest quality. In this way the final quality estimate for the frame 902 is prevented from being unduly high when there are local distortions in a section of the frame. Since the final quality estimate of the frame 902 takes account of local distortions, the quality estimate for the frame 902 may be below the threshold required for the frame 902 to be output such that the frame 902 may be prevented from being output when it contains local distortions which may be perceived detrimentally by the user.

Features from the different methods described above may be combined in any suitable manner to process the video signal received at the device 102 accordingly.

The methods described above (and in particular the method steps shown in the flow charts of FIGS. 3, 5 and 8) may be implemented in hardware or software. For example, the methods described above may be implemented in a computer program product comprising instructions for carrying out the methods, such that when the instructions are executed by the CPU 104 of the device 102 the methods described above are performed. As an example, the methods described above may be implemented in a H.264 decoder.

According to a first aspect there is provided a method of estimating quality of a video signal at a device, the method comprising: receiving frames of the video signal at receiving means of the device, each frame comprising a plurality of blocks of pixels; using a section of a first frame of the video signal, which is correctly received, to provide a concealed block for use in place of a block of a second frame of the video signal; determining a difference measure indicative of a difference between at least some of the pixels surrounding the block in the second frame and the corresponding pixels surrounding the section in the first frame; and using the difference measure to estimate the quality of the second frame of the video signal.

Desirably, the difference (or alternatively the similarity) between the pixels surrounding the concealed block in the second frame and the pixels surrounding the section in the first frame provides an indication of how well the concealed block conceals errors in the block of the second frame. For example, the concealed block may include a copy of the pixels of the section of the first frame, and the pixels surrounding the section in the first frame may be assumed to have a smooth boundary with the pixels of the section, such that the difference between the pixels surrounding the concealed block in the second frame and the pixels surrounding the section in the first frame provides an indication of the smoothness of the boundary between the concealed block and its surrounding pixels in the second frame.

A difference measure (or similarity measure) may be determined for multiple blocks of a frame and the difference measures may be combined (e.g. summed) to provide an estimation of the quality of the frame. A high difference measure may indicate poor error concealment whereas a difference measure of zero would indicate perfect error concealment. Preferably, the difference measure is determined only for blocks which have motion vectors indicating complex (e.g. non-linear) motion. This is can be desirable because even edges of correctly decoded blocks don't match 100% with external edges of its reference block. In other words even for correctly decoded blocks the difference measure will not be equal to "0" (which would indicate a 100% match). Therefore, if we include the difference measures of correctly decoded blocks we will include small difference measures which can be considered to be "noise" which are not useful in determining the quality of concealment in a frame. There is a high probability that blocks with simple motion (e.g. linear motion) will be concealed very well, and as such, the difference measures for these blocks will add to the "noise" in the combination (e.g. the sum) of the difference measures. Therefore by considering only the blocks which have complex motion the "noise" in the difference measures will be less significant compared to the value of the combined, e.g. summed, difference measures for a particular frame.

The block of the second frame may have a motion vector indicating complex motion. The step of using a section of a first frame of the video signal to provide a concealed block may comprise using the motion vector of the block of the second frame to map the block of the second frame to the section of the first frame. The method may further comprise identifying that the motion vector of the block of the second frame indicates complex motion by determining an absolute difference in the motion vector of the block of the second frame and a motion vector of the section of the first frame, wherein if said absolute difference is greater than a threshold value then the motion vector of the block of the second frame may be identified as indicating complex motion.

A plurality of concealed blocks may be provided for use in place of a respective plurality of blocks of the second frame, and the method may further comprise: determining which of said plurality of blocks of the second frame have motion vectors indicating complex motion; determining difference measures for said determined plurality of blocks of the second frame which have motion vectors indicating complex motion; and using the determined difference measures for said determined plurality of blocks of the second frame which have motion vectors indicating complex motion to estimate the quality of the second frame of the video signal.

The block of the second frame of the video signal may be coded with reference to another section of another frame of the video signal using a motion vector of the block of the second frame, and there may be an error in the transmission of said another section of said another frame to the receiving means of the device, and the method may comprise: extrapolating the motion vector of the block of the second frame to identify the section of the first frame of the video signal.

A further block of a further frame of the video signal may be coded with reference to at least the block of the second frame and the method may comprise determining a difference measure for the further block using the difference measure for the block in the second frame. The step of determining a difference measure for the further block may comprise determining the extent to which the further block is coded with reference to the block of the second frame, wherein the difference measure for the block of the second frame may be used to said extent in determining the difference measure for the further block.

The method may further comprise determining whether to display the second frame or another frame of the video signal based on the estimated quality of the second frame of the video signal.

The difference measure may be a function of differences between said at least some of the pixels surrounding the block in the second frame and the corresponding pixels surrounding the section in the first frame.

According to a second aspect there is provided a device for estimating quality of a video signal, the device comprising: receiving means for receiving frames of the video signal, each frame comprising a plurality of blocks of pixels; providing means for using a section of a first frame of the video signal, which is correctly received, to provide a concealed block for use in place of a block of a second frame of the video signal; determining means for determining a difference measure indicative of a difference between at least some of the pixels surrounding the block in the second frame and the corresponding pixels surrounding the section in the first frame; and estimating means for using the difference measure to estimate the quality of the second frame of the video signal.

According to a third aspect there is provided a method of estimating quality of a video signal at a device, the method comprising: receiving frames of the video signal at receiving means of the device, each frame comprising a plurality of blocks of pixels, wherein a particular block of a particular frame is coded with reference to a section of a reference frame, the section including at least part of a plurality of reference blocks of the reference frame, and wherein each of the reference blocks has a respective error measure indicative of an error in the respective reference block; determining an error measure indicative of an error in the particular block of the particular frame by combining the error measures of said plurality of reference blocks; and using the determined error measure for the particular block to estimate the quality of the particular frame of the video signal.

Desirably the propagation of error from a reference frame to a particular frame (which may be inter-coded with reference to the reference frame) can be predicted. By predicting the propagation of error through the sequence of frames of the video signal the quality of the frames of the video signal can be more accurately estimated.

The step of combining may comprise performing a weighted sum of the error measures of the reference blocks. The method may further comprise determining weights for each of the respective reference blocks for use in the weighted sum, said weights being based on the proportion of the section of the reference frame which is covered by the respective ones of said plurality of reference blocks. The error measures may be functions of differences, such as sums of squared differences.

According to a fourth aspect there is provided a device for estimating quality of a video signal, the device comprising: receiving means for receiving frames of the video signal, each frame comprising a plurality of blocks of pixels, wherein a particular block of a particular frame is coded with reference to a section of a reference frame, the section including at least part of a plurality of reference blocks of the reference frame, and wherein each of the reference blocks has a respective error measure indicative of an error in the respective reference block; determining means for determining an error measure indicative of an error in the particular block of the particular frame by combining the error measures of said plurality of reference blocks; and estimating means for using the determined error measure for the particular block to estimate the quality of the particular frame of the video signal.

According to a fifth aspect there is provided a method of estimating quality of a video signal at a device, the method comprising: receiving frames of the video signal at receiving means of the device, each frame comprising a plurality of blocks of pixels, wherein a particular block of a particular frame is intra-coded with reference to at least one other block of the particular frame, wherein the at least one other block has a respective at least one error measure indicative of an error in the respective at least one other block; determining an error measure of the particular block indicative of an error in the particular block, said error measure of the particular block being determined to be equal to the highest of the at least one error measure of the at least one other block of the particular frame; and using the determined error measure for the particular block to estimate the quality of the particular frame of the video signal.

According to a sixth aspect there is provided a device for estimating quality of a video signal, the device comprising: receiving means for receiving frames of the video signal at receiving means of the device, each frame comprising a plurality of blocks of pixels, wherein a particular block of a particular frame is intra-coded with reference to at least one other block of the particular frame, wherein the at least one other block has a respective at least one error measure indicative of an error in the respective at least one other block; determining means for determining an error measure of the particular block indicative of an error in the particular block, said error measure of the particular block being determined to be equal to the highest of the at least one error measure of the at least one other block of the particular frame; and estimating means for using the determined error measure for the particular block to estimate the quality of the particular frame of the video signal.

According to a seventh aspect there is provided a method of estimating quality of a video signal at a device, the method comprising: determining a plurality of quality metrics for a respective plurality of sections of a frame of the video signal wherein said quality metrics are determined based on the quality of blocks of pixels within the respective section, and determining a quality metric for the frame of the video signal based on the quality of blocks of pixels within the frame; determining the minimum of said determined quality metrics; and estimating the quality of the frame based on the determined minimum of said determined quality metrics. The quality metrics may, for example, be sums of squared differences.

According to an eighth aspect there is provided a device for estimating quality of a video signal, the device comprising: quality metric determining means for determining a plurality of quality metrics for a respective plurality of sections of a frame of the video signal wherein said quality metrics are determined based on the quality of blocks of pixels within the respective section, and for determining a quality metric for the frame of the video signal based on the quality of blocks of pixels within the frame; determining means for determining the minimum of said determined quality metrics; and estimating means for estimating the quality of the frame based on the determined minimum of said determined quality metrics.

According to a ninth aspect there is provided a method of outputting a video signal at a device, the method comprising: determining a plurality of quality estimates of a respective plurality of frames of the video signal; based on the quality estimate determined for a particular one of the frames of the video signal, determining whether to output either (i) the particular one of the frames of the video signal or (ii) another one of the frames of the video signal; and outputting the video signal at the device, wherein at the time when the particular one of the frames of the video signal is due to be output, the determined one of the frames of the video signal is output.

Desirably, it may be decided whether to output the particular one of the frames or to display another one of the frames based on the estimated quality of the particular one of the frames of the video signal. In this way, if the quality of the particular one of the frames is below a threshold quality then another frame may be output instead of the particular one of the frames, which may provide a better quality for the outputted video signal than if the particular one of the frames were output. However, if the quality of the particular one of the frames is high then it will be output when it is due to be output in the video signal.

The method may further comprise receiving the frames of the video signal at receiving means of the device. The another one of the frames of the video signal may be the frame immediately preceding the particular one of the frames in the video signal. Alternatively, the another one of the frames of the video signal may be the frame immediately following the particular one of the frames in the video signal.

In some embodiments the method further comprises comparing the quality estimate determined for the particular one of the frames to a threshold value, wherein if the quality estimate determined for the particular one of the frames is above the threshold value then the particular one of the frames is output, and wherein if the quality estimate determined for the particular one of the frames is below the threshold value then said another one of the frames is output. The method may further comprise increasing the threshold value for the particular one of the frames if the frame preceding the particular one of the frames in the video signal is lost or corrupted during transmission. The threshold value may be only increased for the particular one of the frames if the quality estimate determined for the particular one of the frames is below a quality estimate for the latest correctly received frame preceding the lost or corrupted frame in the video signal.

According to a tenth aspect there is provided a device for outputting a video signal, the device comprising: quality estimate determining means for determining a plurality of quality estimates of a respective plurality of frames of the video signal; output determining means for determining, based on the quality estimate determined for a particular one of the frames of the video signal, whether to output either (i) the particular one of the frames of the video signal or (ii) another one of the frames of the video signal; and output means for outputting the video signal at the device, wherein at the time when the particular one of the frames of the video signal is due to be output, the determined one of the frames of the video signal is output.

According to an eleventh aspect there is provided a computer program product for estimating quality of a video signal or for outputting a video signal, the computer program product being embodied on a tangible computer-readable hardware medium and configured so as when executed on a processor of a device to perform the steps of any of the methods described herein. A computer-readable hardware medium is intended to refer to all statutory forms of hardware media and excludes non-statutory forms of media.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claim.

What is claimed is:

1. A method of estimating quality of a video signal at a device, the method comprising:
    receiving frames of the video signal at the device, each frame comprising a plurality of blocks of pixels, a particular block of a particular frame being coded with reference to a section of a reference frame, the section of the reference frame including at least part of a plurality of reference blocks of the reference frame, and each of the reference blocks having a respective error measure indicative of an error in the respective reference block;
    determining an error measure indicative of an error in the particular block of the particular frame by combining the error measures of the plurality of reference blocks; and
    estimating the quality of the particular frame of the video signal based on said determining the error measure for the particular block.

2. The method of claim 1, wherein the combining comprises performing a weighted sum of the error measures of the reference blocks.

3. The method of claim 2, further comprising determining weights for each of the respective reference blocks for use in the weighted sum, the weights being based on a proportion of the section of the reference frame which is covered by respective ones of the plurality of reference blocks.

4. The method of claim 1, wherein the error measures are functions of differences.

5. The method of 4, wherein the functions of the differences are sums of squared differences (SSD).

6. The method of claim 1, further comprising:
    deciding that the particular frame of the video signal is to be output, based on said estimating the quality of the particular frame of the video signal.

7. The method of claim 6, wherein the method further comprises outputting the particular frame of the video signal responsive to the estimate of the quality of the particular frame of the video signal exceeding a threshold.

8. The method of claim 6, wherein the method further comprises outputting, in place of the particular frame, one of: a frame immediately preceding the particular frame in the video signal or a frame immediately following the particular frame in the video signal responsive to the estimate of the quality of the particular frame of the video signal being less than a threshold.

9. A device for estimating quality of a video signal, the device comprising:
    a processing unit; and
    a memory comprising instructions executable by the processing unit to:
    receive frames of the video signal, each frame comprising a plurality of blocks of pixels, a particular block of a particular frame being coded with reference to a section of a reference frame, the section of the reference frame including at least part of a plurality of reference blocks of the reference frame, and each of the reference blocks having a respective error measure indicative of an error in the respective reference block;
    determine an error measure indicative of an error in the particular block of the particular frame from a combination of the error measures of the plurality of reference blocks; and
    estimate the quality of the particular frame of the video signal based on the determined error measure for the particular block.

10. The device of claim 9, wherein the combination of the error measures is a weighted sum of the error measures of the reference blocks.

11. The device of claim 10, wherein the instructions are further executable by the processing unit to:
determine weights for each of the plurality of reference blocks of the weighted sum, the weights being based on the proportion of the section of the reference frame which is covered by respective ones of the plurality of reference blocks.

12. The device of claim 9, wherein the error measures are functions of differences.

13. The device of claim 12, wherein the functions of the differences are sums of squared differences (SSD).

14. The device of claim 9, wherein the instructions are further executable by the processing unit to:
decide that the particular frame of the video signal is to be output, based on the estimate of the quality of the particular frame of the video signal.

15. The device of claim 14, wherein the instructions are further executable by the processing unit to output the particular frame of the video signal responsive to the estimate of the quality of the particular frame of the video signal exceeding a threshold.

16. The device of claim 14, wherein the instructions are further executable by the processing unit to output, in place of the particular frame, one of: a frame immediately preceding the particular frame in the video signal or a frame immediately following the particular frame in the video signal responsive to the estimate of the quality of the particular frame of the video signal being less than a threshold.

17. A computer-readable hardware medium comprising instructions for estimating quality of a video signal, the instructions executable by a processor of a device to perform operations comprising:
receiving frames of the video signal at the device, each frame comprising a plurality of blocks of pixels, a particular block of a particular frame being coded with reference to a section of a reference frame, the section of the reference frame including at least part of a plurality of reference blocks of the reference frame, and each of the reference blocks having a respective error measure indicative of an error in the respective reference block;
determining an error measure indicative of an error in the particular block of the particular frame by combining the error measures of the plurality of reference blocks; and
estimating the quality of the particular frame of the video signal based on said determining the error measure for the particular block.

18. The computer-readable hardware medium of claim 17, wherein the combining comprises performing a weighted sum of the error measures of the reference blocks, the instructions further executable to perform determining weights for each of the respective reference blocks for use in the weighted sum, the weights being based on the proportion of the section of the reference frame which is covered by respective ones of the plurality of reference blocks.

19. The computer-readable hardware medium of claim 18, wherein the error measures are functions of differences, and the functions of the differences are sums of squared differences (SSD).

20. The computer-readable hardware medium of claim 17, wherein the instructions are further executable to perform deciding that the particular frame of the video signal is to be output, based on said estimating the quality of the particular frame of the video signal, wherein the instructions are further executable by the processing unit to output the particular frame of the video signal responsive to the estimate of the quality of the particular frame of the video signal exceeding a threshold, or wherein the instructions are further executable by the processing unit to output, in place of the particular frame, one of: a frame immediately preceding the particular frame in the video signal or a frame immediately following the particular frame in the video signal responsive to the estimate of the quality of the particular frame of the video signal being less than the threshold.

* * * * *